Dec. 24, 1957  J. R. PENROSE  2,817,363
CORRUGATED ALUMINIUM TUBE AND ELECTRIC CABLE
EMPLOYING THE SAME AS A SHEATH
Filed Oct. 30, 1953  2 Sheets-Sheet 1

INVENTOR
JAMES RONALD PENROSE
by
ATTORNEY

JAMES RONALD PENROSE
INVENTOR
ATTORNEY

United States Patent Office 2,817,363
Patented Dec. 24, 1957

2,817,363

CORRUGATED ALUMINIUM TUBE AND ELECTRIC CABLE EMPLOYING THE SAME AS A SHEATH

James Ronald Penrose, Watford, England, assignor to Pirelli-General Cable Works Limited, London, England, a British company Application October 30, 1953, Serial No. 398,856

Claims priority, application Great Britain October 31, 1952

5 Claims. (Cl. 138—50)

The present invention relates to a corrugated aluminium tube and to electric cables employing the same as a sheath, the corrugations being disposed circumferentially or helically.

It has been proposed to provide an electric cable with a corrugated sheath of aluminium or aluminium alloy, the sheath being manufactured by surrounding the core of the cable with a tube and subsequently performing a corrugating operation which may be arranged to bring the troughs of the corrugations into contact with the cable core. The tube on which the corrugating operation is performed to make the sheath may, if desired, be manufactured by welding the edges of a strip or strips of material to form a tube surrounding the core of the cable. Alternatively, the core of the cable may be threaded into a preformed length of tube.

When attempts were made in the past to manufacture such cables, difficulties were experienced, when the cable with the corrugated sheath was subjected to bending tests, by reason of the formation of cracks, especially near the roots or crests of the corrugations, these defects appearing after repeated reversed bending of the cable. We have found that, with cables sheathed with aluminium or soft aluminium alloys, the ability of the cable sheath to withstand such reversed bending tests can be improved by selection of the pitch of the corrugations and the depth of corrugation in relation to the diameter of the sheath. It is to be noted that, throughout this specification, the term "pitch" designates the spacing of the crests of the corrugations axially along the cable sheath, whether such corrugations lie in planes strictly at right angles to the sheath axis or are helical in form. It is, of course, necessary that the depth of corrugation should be sufficient to ensure that, when subjected to the bend test, which may, for example, be performed around a radius equal to six times the overall diameter of the sheath, the corrugations on the outside of the bend are not completely flattened.

According to the present invention, in an electric cable having a circumferentially or helically corrugated sheath of aluminium or a soft aluminium alloy, the exterior root diameter of the corrugations is arranged to lie between 0.92 and 0.84 of the exterior crest diameter of the sheath and the pitch of the corrugations is arranged to be between 0.35 and 0.45 of the exterior crest diameter of the sheath.

Corrugations of the required contour and pitch, as above defined, are conveniently produced by the use of one or more corrugating tools arranged to exert pressure on the exterior of the cable sheath. Preferably the radius of the working portion of the corrugating tool, or of each of them as the case may be, is of the order of one eighth of the exterior crest diameter of the sheath.

If the sheath, when incorporated in the cable, is to be capable of withstanding, without damage, a test such as that above mentioned, namely repeated bending around a radius equal to six times the overall diameter of the sheath, its wall thickness may advantageously be between 0.03 and 0.04 of the exterior crest or overall diameter of the sheath. If, however, such a stringent test be not required, for instance, if the bending radius be enlarged to ten times the exterior crest diameter, a thinner sheath may be employed. In such cases the wall thickness may be 0.03 of the exterior crest diameter +0.01 inch; in respect of cables having a sheath of not less than 1 inch overall diameter, this would result in a wall thickness lying within the above limits.

I have found it particularly advantageous to arrange the corrugating tool so that the exterior crest diameter of the corrugated sheath is substantially equal to the exterior diameter of the tubular sheath before corrugation. Also, if there is any material reduction in the exterior diameter of the sheath as a result of corrugation, this is an indication that excessive work has been performed on the sheath, resulting in thickening of its wall particularly at or near the roots of the corrugations.

One method according to the present invention of manufacturing a corrugated cable sheath will now be described by way of example with reference to the accompanying drawings in which.

Figure 1:
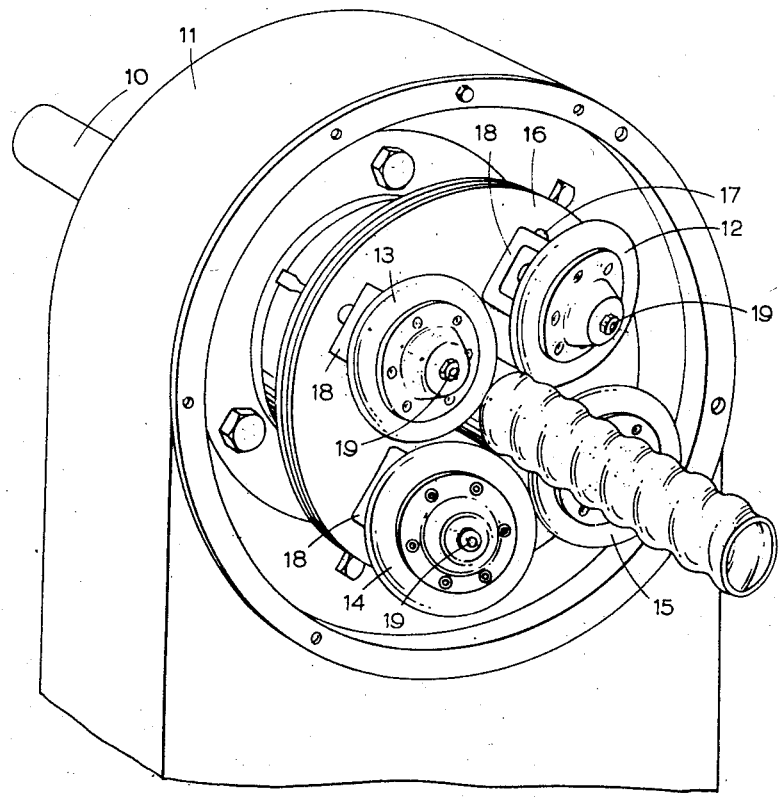
Fig. 1 is a perspective view of the corrugating tool.

A strip of soft aluminium is progressively bent to surround a cable core and thus form a sheath for the core and the edges of the strip are welded together, preferably using a two-phase argon shielded electric arc with tungsten or tungsten base electrodes so as to form a welded sheath 10. The sheath 10 is then subjected to a corrugating operation by means of a rotating corrugating tool carried by a housing 11 and having four rollers 12, 13, 14 and 15 carried by a face plate 16 which is arranged to rotate around the axis of the sheath 10. The face plate 16 has four radial slots such as 17 engaged by bolts (not shown) securing brackets such as 18 carrying spindles such as 19. The brackets 18 are adjustable radially. The roller 12 acts as a corrugating roller while the other rollers 13, 14 and 15 support the sheath 10. The face plate 16 is driven at the requisite speed in relation to the speed of movement of the sheath 10 to produce the desired pitch of corrugation. The depth of corrugation can be set by radial adjustment of the roller 12.

Figure 2:
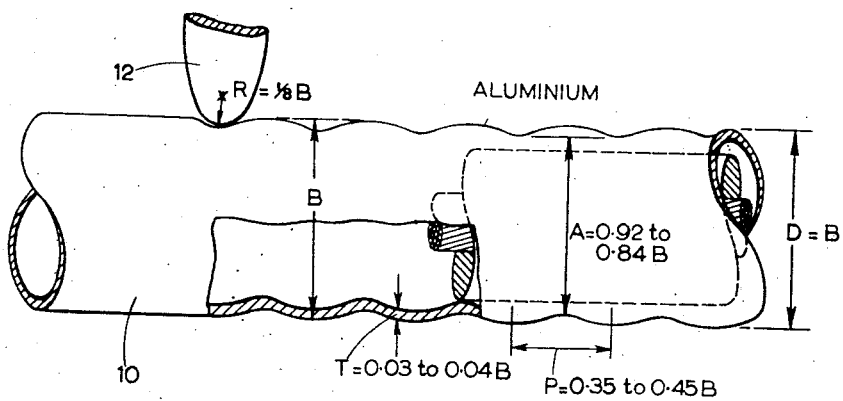
Fig. 2 is an enlarged view partly in longitudinal section showing a piece of the corrugated sheath.

As shown in Figure 2, the depth of the corrugation is set so that the exterior root diameter A of the corrugated sheath lies between 0.92 and 0.84 of the exterior crest diameter B, which is not substantially less than the exterior diameter D of the uncorrugated sheath 10. The pitch of the corrugations P is arranged to be between 0.35 and 0.45 times the exterior crest diameter of the corrugated sheath. The thickness T of the material used for forming the sheath is preferably between 0.03 and 0.04 of the exterior crest diameter B of the corrugated sheath.

I have found that the radius R of the working edge of the corrugating roller 12 to form the corrugations having rounded roots and crests should be of the order of one eighth of the exterior crest diameter B of the corrugated sheath. I have found, however, that using a corrugating tool as above described in which a plurality of rollers are arranged to exert comparatively local pressure on the portions of the tubular sheath which are to become the troughs of the corrugations, it may be desirable, in order to ensure a smooth transition from the periphery of the roots to the periphery of the crests of the corrugations, that where the depth of the corrugation approaches the maximum above mentioned, the radius of the corrugating tool should be reduced somewhat, say to 0.11 times the exterior crest diameter, while towards the minimum depth of corrugation the radius of the corrugating tool should be increased somewhat to, say, 0.13 times the exterior crest diameter. Bearing this in mind, however, a given size of sheath can be corrugated to somewhat different depths if desired.

Figure 3:
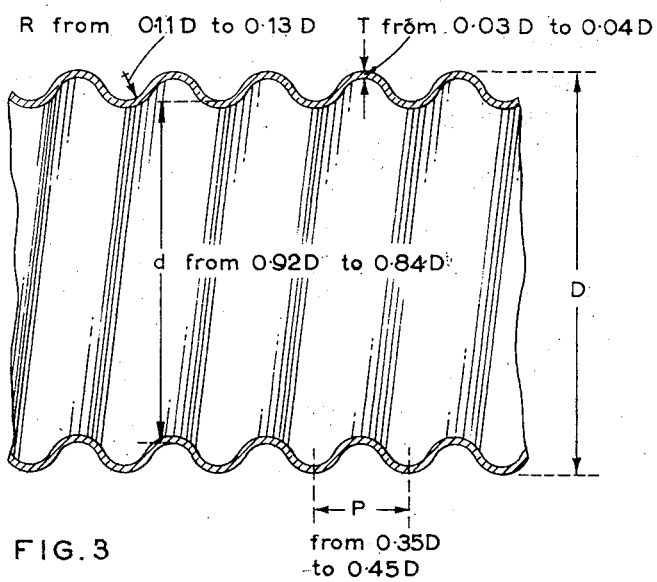
Fig. 3 is an enlarged view in full longitudinal section showing a piece of the corrugated sheath without the internal core, said corrugations being shown as helical.
Figure 4:
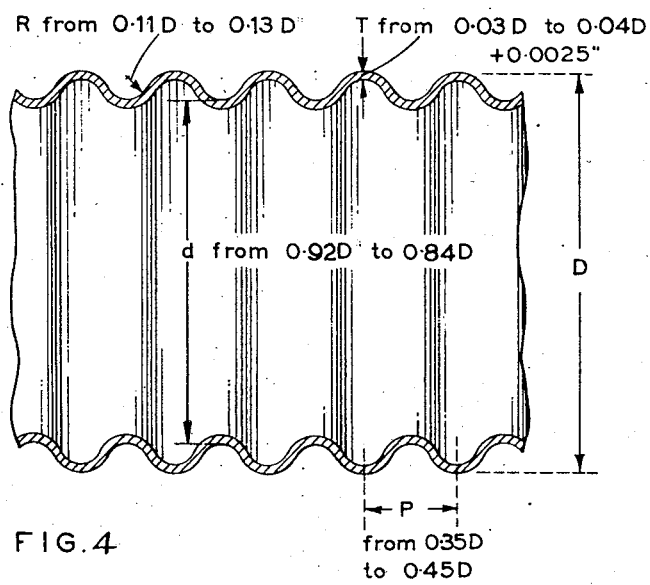
Fig. 4 is an enlarged view in full longitudinal section showing a piece of the corrugated sheath without the internal cable, said corrugations being shown as circumferential and non-helical.

While one embodiment of the present invention has been described as applied to the manufacture of a sheathed electric cable using a corrugating tool having a plurality of rollers which are arranged to form a helical corrugation as shown in Figs. 1–3, it will be appreciated that the principles of the present invention can also be applied to the manufacture of sheathed electric cables using other suitable forms of corrugating tool, which may for instance, produce corrugations which are strictly circumferential as shown in Fig. 4. Alternatively, a sheath having preformed corrugations, of contour and pitch according to the present invention, may be employed.

In the following claims the term "aluminium" is to be regarded as including soft aluminium alloys.

What I claim and desire to secure by Letters Patent of the United States is:

1. In an electric cable having a core, a sheath of aluminium for said core, said sheath being produced from plain tubing and having formed therein encircling corrugations transverse to its length, the exterior root diameter of the corrugations being between 0.92 and 0.84 of the exterior crest diameter of the corrugated sheath, said exterior crest diameter of the sheath being substantially equal to the exterior diameter of the plain tubing and the pitch of the corrugations being 0.35 to 0.45 times the exterior crest diameter of the corrugated sheath.

2. An article as set forth in claim 1 wherein the radius of corrugation of the aluminium sheath in a plane which includes the sheath axis is between 0.11 and 0.13 times the exterior crest diameter.

3. An article as set forth in claim 1 wherein the thickness of the wall of the corrugated aluminium sheath is between 0.03 and 0.04 times the exterior crest diameter of said sheath.

4. An article as set forth in claim 1 wherein the sheath has a diameter less than one inch and wherein the thickness of the wall of said sheath is 0.03 times the exterior crest diameter of said sheath plus 0.01 inch.

5. A corrugated aluminium tube produced from plain tubing and having formed therein encircling corrugations transverse to its length, the exterior root diameter of the corrugations being between 0.92 and 0.84 of the exterior crest diameter of the corrugated tube, said exterior crest diameter of the tube being substantially equal to the exterior diameter of the plain tubing and the pitch of the corrugations being 0.35 to 0.45 times the exterior crest diameter of the corrugated tube.

References Cited in the file of this patent

UNITED STATES PATENTS

| | | |
|---|---|---|
| 798,448 | Pogany | Aug. 29, 1905 |
| 2,121,942 | Barret | June 28, 1938 |
| 2,365,181 | Fentress | Dec. 19, 1944 |
| 2,606,953 | Weston | Aug. 12, 1952 |
| 2,614,607 | Klein | Oct. 21, 1952 |

FOREIGN PATENTS

| | | |
|---|---|---|
| 55,042 | Germany | Feb. 4, 1891 |

OTHER REFERENCES

Publication I, Horn & Ramsey, "Bell System Cable Sheath Problems and Designs," A. I. E. E. Tech. paper 51-330, August 1951 (page 9 relied on).